(12) United States Patent
Kaake et al.

(10) Patent No.: US 10,040,152 B2
(45) Date of Patent: Aug. 7, 2018

(54) MECHANICAL LOCK FOR A WORK SUPPORT

(71) Applicant: GM GLOBAL TECHNOLOGY OPERATIONS LLC, Detroit, MI (US)

(72) Inventors: Matthew D Kaake, Burton, MI (US); Bryan F. Hacker, Williamston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 504 days.

(21) Appl. No.: 14/828,014

(22) Filed: Aug. 17, 2015

(65) Prior Publication Data

US 2017/0050281 A1    Feb. 23, 2017

(51) Int. Cl.
*B23Q 3/10* (2006.01)
*B23Q 3/18* (2006.01)

(52) U.S. Cl.
CPC .......... *B23Q 3/106* (2013.01); *B23Q 3/10* (2013.01); *B23Q 3/108* (2013.01); *B23Q 3/18* (2013.01)

(58) Field of Classification Search
CPC . B23Q 3/106; B23Q 3/10; B23Q 3/18; B23Q 3/06; B23Q 3/108
USPC .................................................. 269/77, 309
See application file for complete search history.

(56) References Cited

U.S. PATENT DOCUMENTS

| | | | | |
|---|---|---|---|---|
| 3,792,855 A | * | 2/1974 | Bondie | B23Q 3/103 269/310 |
| 3,880,046 A | * | 4/1975 | Sessody | B23B 31/204 279/4.09 |
| 3,998,444 A | * | 12/1976 | Stockwell | B23Q 3/108 248/412 |
| 4,909,493 A | * | 3/1990 | Yonezawa | B25B 5/061 269/309 |
| 4,934,884 A | * | 6/1990 | Rooke | H05K 7/1412 411/14 |
| 4,971,339 A | * | 11/1990 | Treff | B23B 31/207 279/132 |
| 5,687,962 A | * | 11/1997 | Goodrich | B23Q 1/52 269/310 |

(Continued)

FOREIGN PATENT DOCUMENTS

| | | |
|---|---|---|
| CN | 1558808 A | 12/2004 |
| CN | 102990393 A | 3/2013 |

(Continued)

*Primary Examiner* — Christopher M Koehler
*Assistant Examiner* — Seahee Yoon
(74) *Attorney, Agent, or Firm* — Quinn IP Law

(57) ABSTRACT

A work support includes a mounting plate and a mechanical lock coupled to the mounting plate. The mechanical lock includes a base coupled to the mounting plate and a support pin. The support pin is movably coupled to the base. As such, the support pin can move relative to the base. The work support further includes a locking collar at least partly disposed inside the base. The locking collar surrounds the support pin and includes a first collar portion disposed around the support pin. The first collar portion has an outer tapered surface facing away from the support pin. The locking collar further includes a second collar portion disposed around the support pin. The second collar portion has an inner tapered surface facing toward the support pin and can move relative to the first collar between an unlocked position and a locked position.

13 Claims, 2 Drawing Sheets

(56) References Cited

U.S. PATENT DOCUMENTS

| | | | | |
|---|---|---|---|---|
| 5,713,564 | A * | 2/1998 | Schindler | B23Q 3/108 269/309 |
| 5,810,344 | A * | 9/1998 | Nishimoto | B23B 31/1071 269/309 |
| 5,887,862 | A * | 3/1999 | Yonezawa | B23Q 3/10 269/310 |
| 5,915,679 | A * | 6/1999 | Kohlert | B25B 1/2421 269/309 |
| 5,957,443 | A * | 9/1999 | Mascola | B23Q 3/108 269/22 |
| 6,101,888 | A * | 8/2000 | Yonezawa | B23Q 1/0072 269/138 |
| 6,186,567 | B1 * | 2/2001 | Blick | B23Q 1/032 294/194 |
| 6,691,994 | B2 * | 2/2004 | Kawakami | B23Q 1/032 269/309 |
| 6,761,103 | B2 * | 7/2004 | Yonezawa | B23Q 1/28 91/44 |
| 7,104,536 | B2 * | 9/2006 | Kitaura | B23Q 1/76 269/309 |
| 7,178,639 | B2 * | 2/2007 | Schmalenbach | F15B 15/262 188/170 |
| 7,303,186 | B2 * | 12/2007 | Yonezawa | B23B 31/402 269/309 |
| 8,403,338 | B2 * | 3/2013 | Hangleiter | B23B 31/265 279/35 |
| 8,444,128 | B2 * | 5/2013 | Karras | B23Q 3/082 269/24 |
| 2013/0113146 | A1 * | 5/2013 | Kawakami | B23Q 3/082 269/25 |

FOREIGN PATENT DOCUMENTS

| | | |
|---|---|---|
| CN | 103072638 A | 5/2013 |
| JP | 2012091308 A | 5/2012 |

* cited by examiner

US 10,040,152 B2

MECHANICAL LOCK FOR A WORK SUPPORT

TECHNICAL FIELD

The present disclosure relates to a mechanical lock. In particular, the present disclosure relates to a work support including a mechanical lock that can be used during a manufacturing process.

BACKGROUND

During manufacturing operations, such as machining, a work support can hold a part in place while a tool performs work on such part. For instance, a tool can machine (e.g., drill) a part while the work support holds the part in place, thereby minimizing errors during the manufacturing process.

SUMMARY

Work supports are used to hold a part while work is performed on that part. In the present disclosure, the term "part" means a physical structure of a tangible object, such as a vehicle, an aircraft, an appliance, or any other suitable object. As a non-limiting example, the part may be a cylinder head of a vehicle engine. During manufacturing, the part should be supported by the work support while work is performed on the part in order to produce a part with a shape as close as possible to the desired form. To this end, the presently disclosed work support includes a support pin for supporting the part and a mechanical lock capable of fixing the position of the support pin relative to the part.

In an embodiment, the work support includes a mounting plate and a mechanical lock coupled to the mounting plate. The mechanical lock includes a base coupled to the mounting plate and a support pin extending along a pin axis. The support pin is movably coupled to the base. As such, the support pin can move relative to the base along the pin axis. The work support further includes a locking collar at least partly disposed inside the base. The locking collar surrounds the support pin and includes a first collar portion disposed around the support pin. The first collar portion has an outer tapered surface facing away from the support pin. The locking collar further includes a second collar portion disposed around the support pin. The second collar portion has an inner tapered surface facing toward the support pin. Moreover, the second collar portion can move relative to the first collar along the pin axis between an unlocked position and a locked position. The locking collar fixes the support pin relative to the base when the second collar portion is in the locked position such that the support pin remains stationary relative to the base and the mounting plate.

The above features and advantages and other features and advantages of the present teachings are readily apparent from the following detailed description of the best modes for carrying out the teachings when taken in connection with the accompanying drawings.

DETAILED DESCRIPTION

Figure 3:
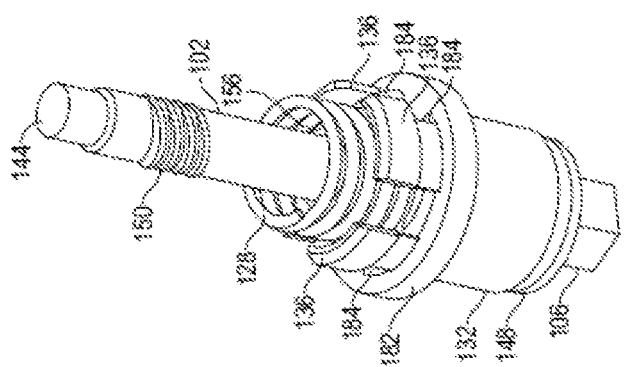
FIG. 3 is a schematic, perspective view of the mechanical lock shown in FIG. 1 without a base and a guide.
Figure 2:
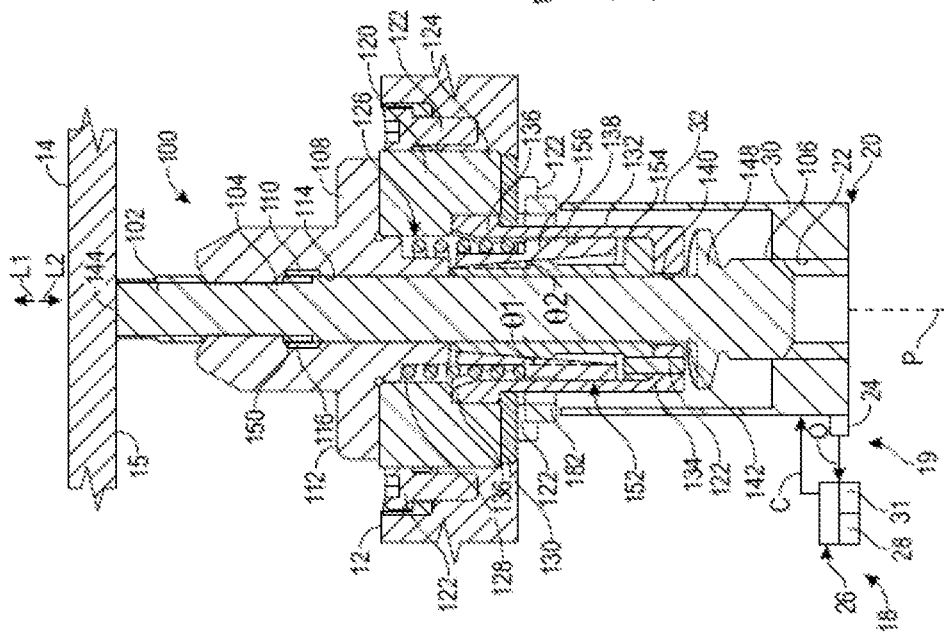
FIG. 2 is a schematic, cross-sectional view of a work support including the mechanical lock shown in FIG. 1, taken along a section line 2-2 of FIG. 1.
Figure 1:
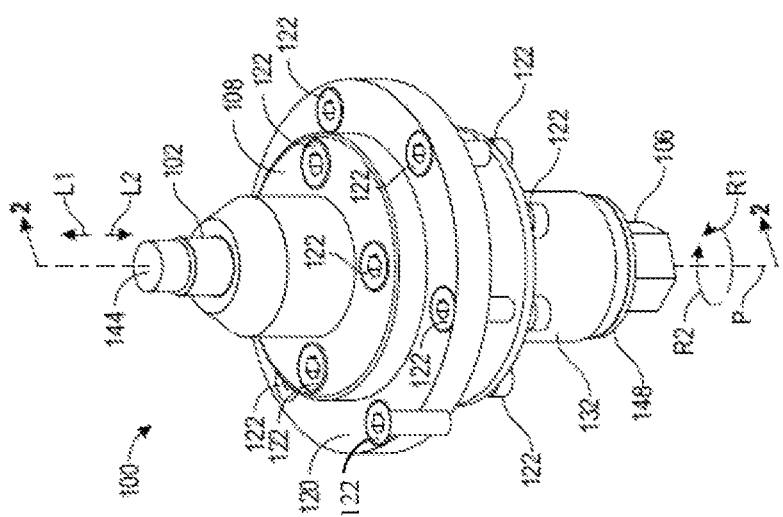
FIG. 1 is a schematic, perspective view of a mechanical lock.

Referring to the drawings, wherein like reference numbers correspond to like or similar components throughout the several figures, and beginning with FIGS. 1 and 2, a work support 10 includes a support pin 102 for supporting a part 14 and a mechanical lock 100 capable of fixing the position of the support pin 102 relative to the part 14. The mechanical lock 100 can be directly coupled to a mounting plate 12 and can be used to fix the position of the support pin 102 relative to the mounting plate 12. The mechanical lock 100 is fully mechanical and, therefore, does not include pneumatic or hydraulic circuits in order minimize costs. The mounting plate 12 and the mechanical lock 100 are part of the work support 10, which may include additional components.

The mechanical lock 100 includes the support pin 102, which extends (i.e., is elongated) along a pin axis P. As discussed in detail below, the support pin 102 can move relative to the mounting plate 12 along the pin axis P in order to directly contact the part 14. The part 14 may have a flat surface 15 configured to contact the support pin 102. The work support 10 is part of a manufacturing assembly 18, which additionally includes a tool 20, such as a nutrunner or torque wrench, capable of applying torque to the support pin 102. The tool 20 may include a motor in order to apply torque to the support pin 102 and thereby rotate the support pin 102 about the pin axis P in the direction indicated by arrow R1. As it rotates in the direction indicated by arrow R1, the support pin 102 moves linearly along the pin axis P in the direction indicated by arrow L1. Rotating the support pin 102 in the opposite direction (as indicated by arrow R2) causes the support pin 102 to move in the direction indicated by arrow L2, which is opposite to the direction indicated by arrow L1.

The support pin 102 includes a shank 104 and a head 106 extending from the shank 104 along the pin axis P. The head 106 may have a hexagonal cross-section in order to facilitate engagement between the tool 20 and the support pin 102. Accordingly, the tool 20 may have a socket 22 configured, shaped, and sized to receive the head 106. The socket 22 may have a hexagonal shape corresponding to the hexagonal shape of the head 106. Regardless of the shape of the socket 22, the tool 20 can directly contact the support pin 102 in order to apply torque to the support pin 102.

The manufacturing assembly 18 further includes a feedback system 19 for controlling the operation of the mechanical lock 100. The feedback system 19 includes a torque sensor 24 configured to measure the magnitude of the torque experienced by the support pin 102. The torque sensor 24 may be part of the tool 20 or may be an external component attached to the tool 20 or the locking pin 102. In one embodiment, the torque sensor 24 is a transducer that converts torsional mechanical input into electrical output signals O. Accordingly, the electrical output signals O are indicative of the torque magnitude experienced by the support pin 102.

The feedback system 19 also includes a controller 26 in communication (e.g., electronic communication) with the torque sensor 24 and capable of receiving the electrical output signals O generated by the torque sensor 24. The term "controller" refers to any one or various combinations of Application Specific Integrated Circuit(s) (ASIC), electronic circuit(s), central processing unit(s), e.g., microprocessor(s) and associated non-transitory memory medium in the form of memory and storage devices (read only, programmable read only, random access, hard drive, etc.). The non-transitory memory medium is capable of storing machine readable instructions in the form of one or more software or firmware programs or routines, combinational logic circuit(s), input/output circuit(s) and devices, signal conditioning and buffer circuitry and other components that can be accessed by one or more processors. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. The controller 26 may also include any required logic circuitry including but not limited to proportional-integral-derivative (PID) control logic, a high-speed clock, analog-to-digital (A/D) circuitry, digital-to-analog (D/A) circuitry, a digital signal processor or DSP, and the necessary input/output (I/O) devices and other signal conditioning and/or buffer circuitry. The controller 26 can execute control routine(s) to provide desired functions, including monitoring inputs from sensing devices and other networked controllers and executing control and diagnostic routines to control operation of actuators, such as the tool 20. Routines may be executed at regular intervals, for example each 100 microseconds or 3.125, 6.25, 12.5, 25 and 100 milliseconds during ongoing operation. Alternatively, routines may be executed in response to occurrence of a triggering event.

In the depicted embodiment, the controller 26 includes a processor 28 and memory 31. The memory 31 includes tangible, non-transitory memory media such as read only memory (ROM), random access memory (RAM), optical memory, flash memory, electrically-programmable read-only memory (EPROM), and the like. In the depicted embodiment, the processor 28 is an integrated circuit in electronic communication with the memory 31 and capable of executing software, firmware, programs, instructions, control routines, code, algorithms or any other suitable controller-executable instruction.

Communications between the controller 26 and the torque sensor 24 or the tool 20 may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The controller 50 is also in communication (e.g., electronic communication) and can send command signals C to the tool 20. As discussed in detail below, the controller 26 can generate and send command signals C to the tool 20 in response to the electrical output signals O received from the torque sensor 24 in order to control the operation of the tool 20. The command signals C are indicative of the operations to be performed by the tool 20. For example, the controller 26 can command the tool 20 to deactivate (i.e., stop applying torque to the support pin 102) when the magnitude of the torque experienced by the support pin 102 is greater than a predetermined torque threshold. The support pin 102 experiences a torque with a magnitude that is greater than the predetermined torque threshold when the support pin 102 is direct contact with (and pressed against) the part 14. The controller 26 can continuously monitor the torque experienced by the support pin 102 based at least in part on the electrical output signals O received from the torque sensor 24 in order to detect when the support pin 102 is in direct contact (and pressed against) the part 14.

In addition to the support pin 102, the mechanical lock 100 includes a base 120 directly coupled to the mounting plate 12. In the depicted embodiment, fasteners 122, such as bolts, extend through the base 120 and into the mounting plate 12 in order to couple the base 120 to the mounting plate 12. The base 120 includes a base body 124 and defines an inner base cavity 126 extending through the base body 124. The inner base cavity 126 is configured, shaped, and sized to partially receive the support pin 102. A spring 128, such as a coil spring, is disposed inside the inner base cavity 126. The spring 128 surrounds the support pin 102 and can bias the mechanical lock 100 towards its unlocked position as discussed below.

The mechanical lock 100 includes a guide 108 supported by the base 120. Fasteners 122, such as bolts, can extend through the guide 108 and into the base 120 in order to directly couple the base 120 to the guide 108. Although the guide 108 is partially disposed on the base 120, a portion of the guide 108 is disposed inside the inner base cavity 126 in order to secure the guide 108 to the base 120. The spring 128 contacts the guide 108 inside the inner base cavity 126. The guide 108 includes a guide body 110 and a guide opening 112 extending through the guide body 110. In the depicted embodiment, the guide opening 112 is configured as a bore. Irrespective of its configuration, the guide opening 112 is shaped and sized to receive the support pin 102. The guide body 110 has a circumferential inner guide surface 114 that defines the guide opening 112. The inner circumferential inner guide surface 114 has an inner threaded portion 116 configured to mate with an externally threaded portion 150 of the support pin 102.

The mechanical lock 100 further includes a ring 130 directly coupled to the base 120. Fasteners 122 can extend through the ring 130 and into the base 120 in order to couple the ring 130 to the base 120. The ring 130 surrounds the spring 128 and the support pin 102 and extends partially into the inner base cavity 126. The mechanical lock 100 also includes an attachment collar 132 partly disposed inside the inner base cavity 126. The ring 130 also surrounds part of the attachment collar 132. The attachment collar 132 includes an attachment collar body 134 and a plurality of hooks 136 extending from the attachment collar body 134. The hooks 136 are annularly spaced apart from each other. Further, the hooks 136 are partly disposed inside the inner base cavity 126 and engage (e.g., directly contact) the ring 130, thereby coupling the attachment collar 132 to the ring 130. Accordingly, the ring 130 surrounds part of the attachment collar 132. The attachment collar body 134 has an inner attachment cavity 138 configured, shaped, and sized to receive the support pin 102. An attachment opening 140 extends through the attachment collar body 134 and directly leads to the inner attachment cavity 138. The attachment opening 140 is configured, shaped, and sized to receive the shank 104 of the support pin 102.

The shank 104 of the support pin 102 has a first shank end 142 and a second shank end 144 opposite the first shank end 142. The first shank end 142 is closer to the head 106 than the second shank end 144. The second shank end 144 is configured to directly contact the part 14 in order to support the part 14. The support pin 102 further includes an annular rim 148 disposed between the first shank end 142 and the head 106. The annular rim 148 can serve as a mechanical stop to limit the linear movement of the support pin 102 relative to the base 120 along the pin axis P. To do so, the annular rim 148 can contact the attachment collar 132 to prevent the support pin 102 from moving further in the direction indicated by arrow L1. The shank 104 includes the externally threaded portion 150, which is constructed to mate with the inner threaded portion 116 of the guide 108.

With reference to FIGS. 1-5, aside from the support pin 102, the mechanical lock 100 includes a locking collar 152 for fixing the position of the support pin 102 relative to the base 120 and the mounting plate 12. The locking collar 152 is disposed inside attachment collar 132. At least part of the locking collar 152 is located inside the inner base cavity 126. The locking collar 152 includes a first or inner collar portion 154 and a second or outer collar portion 156 surrounding the first collar portion 154.

The first collar portion 154 is directly coupled to the attachment collar 132 and, therefore, remains stationary relative to the attachment collar 132, the guide 108, the base 120, and the ring 130. In the depicted embodiment, a fastener 122, such as a pin, directly couples the attachment collar 132 to the first collar portion 154. The first collar portion 154 includes a first main body 158 and a first tapered body 160 coupled to the first main body 158. The first main body 158 has a circumferential shape (e.g., cylindrical shape) and surrounds the support pin 102. The first tapered body 160 also surrounds the support pin 102 and may be in direct contact with the support pin 102. In the depicted embodiment, the first tapered body 160 has a circumferential shape (e.g., cylindrical shape), but it is contemplated that the first tapered body 160 may include a plurality of annular spaced components. Regardless its particular shape, the first tapered body 160 has a first inner surface 162 and an outer tapered surface 164 opposite the first inner surface 162. The first inner surface 162 is parallel to the pin axis P and in direct contact with the support pin 102 in order to facilitate fixing the position of the support pin 102 relative to the base 120 and the mounting plate 12 as discussed below. The outer tapered surface 164 faces away from the support pin 102 and defines an oblique angle (hereinafter, the first oblique angle θ1) relative to the pin axis P. Consequently, the outer cross-sectional dimension D1 (e.g., the outer diameter) of the first tapered body 160 decreases in the direction indicated by arrow L1. In other words, the outer cross-sectional dimension D1 of the first tapered body 160 increases in the direction indicated by arrow L2, which is opposite to the direction indicated by arrow L1.

Figure 4:
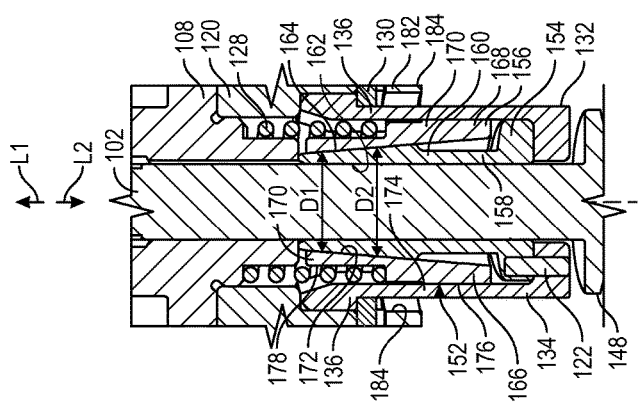
FIG. 4 is a schematic, cross-sectional, partial view of the mechanical lock, shown in an unlocked position.

The second collar portion 156 is movably coupled to the first collar portion 154 and is partly disposed inside the attachment collar 132 and the base 120. In the depicted embodiment, the second collar portion 156 includes a second tapered body 166, which includes a first tapered portion 168 and a second tapered portion 170 coupled to the first tapered portion 168. The first tapered portion 168 is entirely disposed inside the attachment collar 132, has a circumferential shape (e.g., frusto-conical shape), and surrounds the support pin 102 and the first main body 158 of the first collar portion 154. The outer cross-sectional dimension (e.g., outer diameter) of the second tapered portion 170 is smaller to the outer cross-sectional dimension (e.g., outer diameter) of the first tapered portion 168 in order to allow the spring 128 to surround the second tapered portion 170. The spring 128 does not surround the first tapered portion 168. Rather, the spring 128 is in contact with the first tapered portion 168 in order to bias the second collar portion 156 away from the guide 108 in the direction indicated by arrow L2 towards its unlocked position (FIG. 4). In particular, the spring 128 is partly disposed between the hooks 136 and the second tapered portion 170.

The second tapered body 166 includes has an inner tapered surface 172 and an outer surface 174 opposite the inner tapered surface 172. The outer surface 174 includes at least a first outer surface portion 176, a second outer surface portion 178, and a third outer surface portion 180 interconnecting the first outer surface portion 176 and the second outer surface portion 178. The first outer surface portion 176 and the second outer surface portion 178 may be parallel to the pin axis P. The third outer surface portion 180 is perpendicular to the pin axis P in order to allow the spring 128 to exert a biasing force on the second collar portion 156.

The inner tapered surface 172 defines an oblique angle (hereinafter, the second oblique angle θ2) relative to the pin axis P. Consequently, the inner cross-sectional dimension D2 (e.g., the inner diameter) of the second tapered body 166 decreases in the direction indicated by arrow L1. In other words, the inner cross-sectional dimension D2 of the second tapered body 166 increases in the direction indicated by arrow L2, which is opposite to the direction indicated by arrow L1. The first oblique angle θ1 and the second oblique angle θ2 are complementary angles in order to facilitate movement of the second collar portion 156 relative to the first collar portion 154 along the pin axis P. In the present disclosure, the term "complementary angles" means two angles which sum equals ninety degrees. Thus, in the depicted embodiment, the sum of the first oblique angle θ1 and the second oblique angle θ2 is equal to ninety degrees. The inner tapered surface 172 is in direct contact with the support pin 102 in order to maximize the compressive force exerted by the locking collar 152 on the support pin 102 when the second collar portion 156 is in the locked position. Moreover, the inner tapered surface 172 is in direct contact with the outer tapered surface 164 in order to facilitate movement of the second collar portion 156 relative to the first collar portion 154 between the locked position and the unlocked position.

The locking collar 152 includes an annular lip 182 directly coupled to the second tapered body 166 of the second collar portion 156. The annular lip 182 at least partly surrounds the attachment collar 132 in order to facilitate engagement with the tool 20. In the depicted embodiment, the locking collar 152 has annularly arranged holes 184 extending through the annular lip 182. The holes 184 are configured, shaped, sized, and positioned to receive the hooks 136 of the attachment collar 132. The annular lip 182 is partly disposed outside the attachment collar 132 in order to allow the tool 20 to contact and exert a force on the second collar portion 156 while it also applies torque to the support pin 102. Because the annular lip 182 is coupled to the second tapered body 166, moving the annular lip 182 along the pin axis P causes the second collar portion 156 to also move along the pin axis P.

Figure 5:
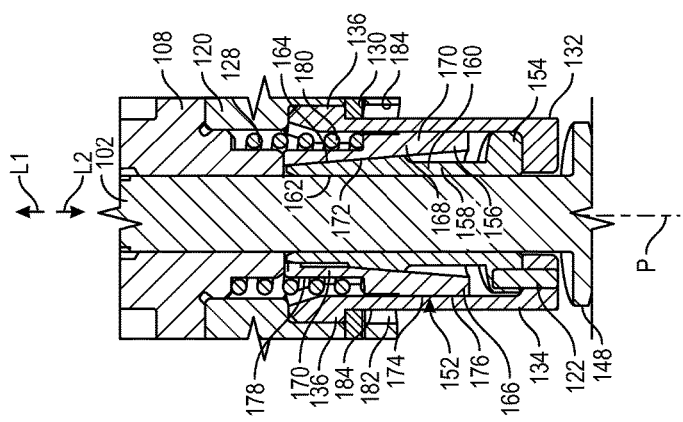
FIG. 5 is a schematic, cross-sectional, partial view of the mechanical lock, shown in a locked position.

As shown in FIG. 2, the tool 20 can be used not only to apply torque to the support pin 102 but also to move the second collar portion 156 relative to the first collar portion 154 along the pin axis P between an unlocked position (FIG. 4) and a locked position (FIG. 5). As discussed above, the socket 22 of the tool 20 can securely receive the head 106 of the support pin 102 in order to allow the tool 20 to apply torque to the support pin 102. The tool 20 includes a main tool body 30, which defines the socket 22, and a hollow rod 32 extending from the main tool body 30 along the pin axis P when the socket 22 receives the head 106 of the support pin 102. The hollow rod 32 may have a cylindrical shape and, regardless of its shape, can at least partially surround the attachment collar 132 when the socket 22 securely receives the head 106 of the support pin 102.

The hollow rod 32 is monolithically formed with the main tool body 30 and therefore remains stationary relative to the main tool body 30. Accordingly, as the tool 20 is rotated about the pin axis P when the tool 20 is engaged with the support pin 102, the hollow rod 32 rotates about the pin axis P and moves along the pin axis P in the direction indicated by arrow L1 or the direction indicated by arrow L2. The hollow rod 32 is configured, shaped, and sized to contact the annular lip 182 when the socket 22 securely receives the head 106 of the support pin 102 in order to allow the hollow rod 32 to exert a force on the second collar portion 156 in the direction indicated by arrow L1. As the hollow rod 32 exerts a force directly on the annular lip 182, the second collar portion 156 moves relative to the first collar portion 154 in the direction indicated by arrow L1.

Rotating the tool 20 about the pin axis P in the rotational direction indicated by arrow R1 (FIG. 1) when the socket 22 securely receives the head 106 causes the support pin 102 to rotate about the pin axis P and translate along the pin axis P. Furthermore, rotating the tool 20 when the socket 22 securely receives the head 106 also causes the hollow rod 32 to drive the second collar portion 156 from the unlocked position (FIG. 4) to the locked position (FIG. 5). As the second collar portion 156 moves from the unlocked position to the locked position, the second tapered body 166 exerts a compressive force on the first tapered body 160. In turn, the first tapered body 160 exerts a compressive force on the support pin 102, thereby preventing the support pin 102 from moving along the pin axis P (especially in the direction indicated by arrow L2). In other words, the support pin 102 remains stationary relative to the mounting plate 12 and the base 120 when the second collar portion 156 is in the locked position.

Figure 6:
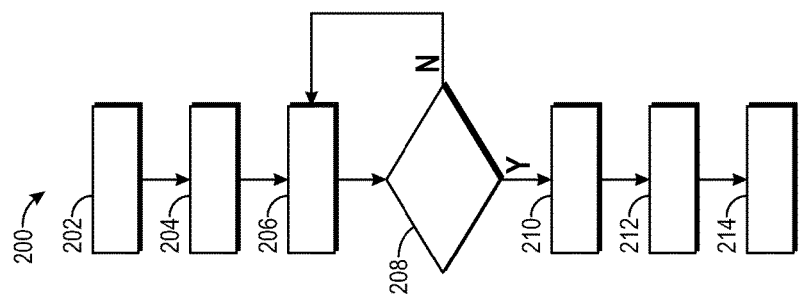
FIG. 6 is a flowchart of a method for operating a manufacturing assembly including the mechanical lock shown in FIG. 1.

The manufacturing assembly 18 can be used to support the part 14 while work is performed on that part. To do so, the controller 26 may be specifically programmed to execute a method 200 as illustrated as a flowchart in FIG. 6. The method 200 begins at step 202, which entails placing the second collar portion 156 in the unlocked position (FIG. 4) if it is not already in that position. To do so, the tool 20 can be secured to the support pin 102. Then, the controller 26 commands the tool 20 to apply torque to the support pin 102. In response to this command, the tool 20 applies torque to the support pin 102. Applying torque to the support pin 102 causes the support pin 102 to rotate, for example in the direction indicated by arrow R2, and to move in the direction indicated by arrow L2. At this juncture, the tool 20 also moves in the direction indicated by arrow L2 (i.e., away from the guide 108). As tool 20 moves away from the guide 108, the force exerted by hollow rod 32 of the tool 20 on the annular lip 182 of the second collar portion 156 decreases, thereby allowing the spring 128 to bias the second collar portion 156 toward the unlocked position (FIG. 4). The biasing force of the spring 128 eventually drives the second collar portion 156 all the way to the unlocked position. Once the second collar portion 156 is in the unlocked position, the method 200 continues to step 204.

At step 204, the controller 26 commands the tool 20 to apply torque to the support pin 102 in order to move the support pin 102 toward the part 14. In response to this command, the tool 20 applies torque to the support pin 102. In this step, applying torque to the support pin 102 causes the support pin 102 to rotate, for example in the direction indicated by arrow R1, and to move in the direction indicated by arrow L1 toward the part 14. As the tool 20 moves toward the part 14, the force exerted by hollow rod 32 of the tool 20 on the annular lip 182 of the second collar portion 156 increases. Consequently, the tool 20 drives the second collar portion 156 toward the locked position (FIG. 5) against the biasing force of the spring 128.

Step 206 of the method 200 is performed at the same time as step 204 and entails determining the magnitude of the torque experienced by the support pin 102. To do so, the torque sensor 24 may continuously monitor the torque experienced by the support pin 102 at, for example, regular intervals. The controller 26 then receives the electrical output signals O received from the torque sensor 24 in order determine the torque experienced by the support pin 102. The method 200 then proceeds to step 208.

At step 208, the controller 26 compares the torque experienced by the support pin 102 with the predetermined torque threshold in order to determine whether the torque experienced by the support pin 102 is greater than the predetermined torque threshold. The predetermined threshold is indicative of the moment when the second shank end 144 of the support pin 102 is at least in direct contact with (and possibly pressed against) the part 14. If the magnitude of the torque experienced by the support pin 102 is not greater than the predetermined torque threshold, then method 200 returns to step 206. If the magnitude of the torque experienced by the support pin 102 is greater than the predetermined torque threshold, then method 200 continues to step 210.

At step 210, the controller 26 commands the tool 20 to deactivate (i.e., stop applying torque to the support pin 102). In other words, the controller 26 commands the tool 20 to stop applying torque to the support pin 102 only when the magnitude of the torque experienced by the support pin 102 is greater than the predetermined torque threshold. In response to this command, the tool 20 stops applying torque to the support pin 102. The method 200 then continues to step 212.

At step 212, work is performed on the part 14. As a non-limiting example, a hole may be drilled on the part. After all the desired work has been performed on the part 14, the method 200 continues to step 214. At step 214, the controller 26 commands the tool 20 to apply torque to the support pin 102 in order to move the second shank end 144 of the support pin 102 away from the part 14 as described above with respect to step 202. In response, the tool 20 applies torque to the support pin 102 in order to move the second shank end 144 in the direction indicated by arrow L2.

While the best modes for carrying out the teachings have been described in detail, those familiar with the art to which this disclosure relates will recognize various alternative designs and embodiments for practicing the teachings within the scope of the appended claims.

The invention claimed is:
1. A work support, comprising
    a mounting plate;
    a mechanical lock coupled to the mounting plate, wherein the mechanical lock includes:
        a base coupled to the mounting plate;

a support pin extending along a pin axis, wherein the support pin is movably coupled to the base such that the support pin is movable relative to the base along the pin axis;

a locking collar at least partly disposed inside the base, wherein the locking collar surrounds the support pin and includes:

a first collar portion disposed around the support pin, wherein the first collar portion has an outer tapered surface facing away from the support pin;

a second collar portion disposed around the support pin, wherein the second collar portion has an inner tapered surface facing toward the support pin, and the second collar portion is movable relative to the first collar portion along the pin axis between an unlocked position and a locked position;

wherein the locking collar fixes the support pin relative to the base when the second collar portion is in the locked position such that the support pin remains stationary relative to the base and the mounting plate; the work support further comprising:

a ring coupled to the base and an attachment collar coupled to the ring, wherein the locking collar is partly disposed inside the ring and the attachment collar; and wherein the attachment collar includes an attachment collar body and a plurality of hooks extending from the attachment collar body, and the hooks are directly coupled to the ring.

2. The work support of claim 1, wherein the outer tapered surface defines a first oblique angle relative to the pin axis, the inner tapered surface defines a second oblique angle relative to the pin axis, and the first oblique angle and the second oblique angle are complementary.

3. The work support of claim 1, wherein the first collar portion is coupled to the attachment collar body such that the first collar portion remains stationary relative to the attachment collar, the base, and the ring.

4. The work support of claim 3, wherein the locking collar includes an annular lip partly disposed outside the attachment collar, and the annular lip is coupled to the second collar portion.

5. The work support of claim 4, wherein the annular lip includes a plurality of annularly arranged holes, and each of the hooks extends through one of the annularly arranged holes.

6. The work support of claim 5, further comprising a guide supported by the base, wherein the guide is partly disposed inside the base, the guide includes an inner threaded portion, the support pin includes a shank, and the shank has an externally threaded portion mating with the inner threaded portion.

7. The work support of claim 6, further comprising a spring partially surrounding the guide, the support pin, and the locking collar, wherein the spring is disposed between the guide and the second collar portion.

8. The work support of claim 1, wherein the work support is characterized by an absence of pneumatic and hydraulic circuits.

9. A mechanical lock, comprising:
a base;
a support pin extending along a pin axis, wherein the support pin is movably coupled to the base such that the support pin is movable relative to the base along the pin axis;

a locking collar at least partly disposed inside the base, wherein the locking collar surrounds the support pin and includes:

a first collar portion disposed around the support pin, wherein the first collar portion has an outer tapered surface facing away from the support pin;

a second collar portion disposed around the support pin, wherein the second collar portion has an inner tapered surface facing toward the support pin, the second collar portion is movable relative to the first collar portion along the pin axis between an unlocked position and a locked position;

wherein the locking collar fixes the support pin relative to the base when the second collar portion is in the locked position such that the support pin remains stationary relative to the base; the mechanical lock further comprising:

a ring coupled to the base and an attachment collar coupled to the ring, wherein the locking collar is partly disposed inside the ring and the attachment collar; and wherein the attachment collar includes an attachment collar body and a plurality of hooks extending from the attachment collar body, and the hooks are directly coupled to the ring.

10. The mechanical lock of claim 9, wherein the outer tapered surface defines a first oblique angle relative to the pin axis, the inner tapered surface defines a second oblique angle relative to the pin axis, and the first oblique angle and the second oblique angle are complementary.

11. The mechanical lock of claim 9, wherein the first collar portion is coupled to the attachment collar body such that the first collar portion remains stationary relative to the attachment collar, the base, and the ring, the locking collar includes an annular lip partly disposed outside the attachment collar, and the annular lip is coupled to the second collar portion.

12. The mechanical lock of claim 11, further comprising a guide supported by the base, wherein the guide is partly disposed inside the base, the guide includes an inner threaded portion, and the support pin includes a shank, the shank has an externally threaded portion mating with the inner threaded portion, the annular lip includes a plurality of annularly arranged holes, and each of the hooks extends through one of the annularly arranged holes.

13. A manufacturing assembly, comprising:
a mounting plate;
a mechanical lock coupled to the mounting plate, wherein the mechanical lock includes:
a base coupled to the mounting plate;
a support pin extending along a pin axis, wherein the support pin includes a head and a shank extending from the head, and the support pin is movably coupled to the base such that the support pin is movable relative to the base along the pin axis;

a locking collar at least partly disposed inside the base, wherein the locking collar surrounds the support pin and includes:

a first collar portion disposed around the support pin, wherein the first collar portion has an outer tapered surface facing away from the support pin;

a second collar portion disposed around the support pin, wherein the second collar portion has an inner tapered surface facing toward the support pin, the second collar portion is movable relative to the first collar portion along the pin axis between an unlocked position and a locked position, and the locking collar fixes the support pin relative to the base when the second collar portion is in the locked position such that the support pin remains stationary relative to the base and the mounting plate; and a tool having a socket configured to securely receive the head of the support pin; and a controller in communication with the tool and a torque sensor in communication with the controller, wherein the torque sensor is coupled to the tool such that the torque sensor is capable of measuring a magnitude of a torque experienced by the support pin when the socket securely receives the head of the support pin and the tool is applying torque to the support pin, and the controller is programmed to command the tool to stop applying torque to the support pin when the magnitude of the torque experienced by the support pin is greater than a predetermined torque threshold.

* * * * *